(12) United States Patent
Schnaars et al.

(10) Patent No.: US 6,394,436 B1
(45) Date of Patent: May 28, 2002

(54) SUSPENSION-STRUT BEARING

(75) Inventors: Wolfgang Schnaars, Osnabrück; Ulrich Lux, München; Peter Kainz, Hitzhofen; Michael Sand, Gaimersheim, all of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,015

(22) PCT Filed: Apr. 27, 2000

(86) PCT No.: PCT/DE00/01308

§ 371 (c)(1),
(2), (4) Date: Feb. 15, 2001

(87) PCT Pub. No.: WO00/66909

PCT Pub. Date: Nov. 9, 2000

(30) Foreign Application Priority Data

Apr. 29, 1999 (DE) .......................... 199 19 189

(51) Int. Cl.[7] .................................. F16F 7/00
(52) U.S. Cl. .................... 267/220; 267/141.4; 267/294; 280/124.147
(58) Field of Search ................. 267/220, 153, 267/292, 293, 294, 141.5; 280/124.147, 124.155; 188/321.11

(56) References Cited

U.S. PATENT DOCUMENTS

| 4,290,626 A | * | 9/1981 | Sullivan, Jr. et al. ....... 280/692 |
| 4,465,296 A | | 8/1984 | Shiratori et al. |
| 4,478,396 A | | 10/1984 | Kawaura |
| 5,076,725 A | * | 12/1991 | Nakaura ..................... 403/227 |
| 5,263,692 A | | 11/1993 | Ito |
| 5,362,035 A | * | 11/1994 | Carter ........................ 267/220 |
| 5,664,650 A | * | 9/1997 | Kammel et al. ....... 188/322.11 |
| 5,762,313 A | * | 6/1998 | Siemer ........................ 248/635 |
| 6,007,061 A | * | 12/1999 | Kammel et al. ............ 267/220 |
| 6,161,822 A | * | 12/2000 | Hurst et al. ................ 267/220 |

FOREIGN PATENT DOCUMENTS

| DE | 4326197 A1 | 2/1994 |
| EP | 0381566 A1 | 8/1990 |
| FR | 2710381 | 3/1995 |
| JP | 57208332 | 12/1982 |
| JP | 06280939 | 10/1994 |

* cited by examiner

Primary Examiner—Christopher P. Schwartz
Assistant Examiner—Benjamin A Pezzlo
(74) Attorney, Agent, or Firm—McGlew and Tuttle, P.C.

(57) ABSTRACT

A McPherson strut bearing for the upper connection of a McPherson strut in a motor vehicle has an inner part (1) with a central through hole (2) for accommodating the upper end of the McPherson strut. An elastomer body (3) is arranged circularly on the outer circumference of the inner part (1). A cage (4) accommodates the inner part (1) with the elastomer body. An elastic bearing body (5) completely accommodates the cage (4) up to a bilateral opening cross section (6, 7), where at least the cage (4), the bearing body (5) and a circlip (9) surrounding the bearing body are divided in a plane passing through the central longitudinal axis (10) of the McPherson strut bearing.

18 Claims, 4 Drawing Sheets

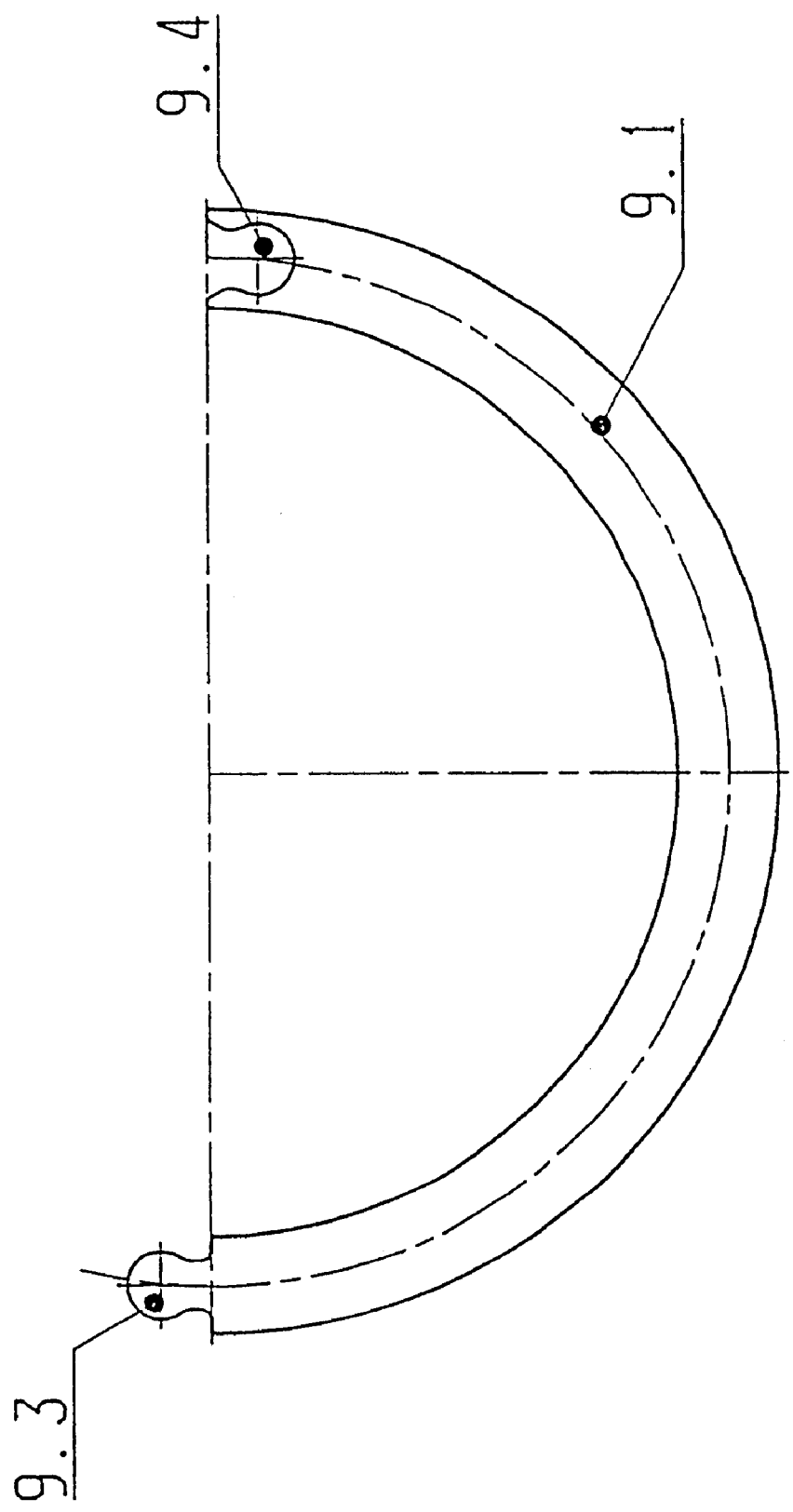

SUSPENSION-STRUT BEARING

SPECIFICATION

The present invention pertains to a McPherson strut bearing for the upper connection of a McPherson strut in a motor vehicle.

McPherson strut bearings of prior-art designs are used to keep the vibrations generated on the wheel suspension of a motor vehicle away from the body.

The upper ends of the McPherson struts connected to the McPherson strut bearing are accommodated mostly in a damping spring, which is supported on the lower outer circumference of the McPherson strut bearing. This type of wheel suspension has been known as the McPherson principle.

Such a suspension mounting with a McPherson strut bearing is described, e.g., in DE 43 26 197 A1. The solution disclosed in the said document contains a McPherson strut bearing with a metallic inner part, in which a central through hole is present for mounting the upper end of the McPherson strut. A circular elastomer body is injection-molded on the outer circumference of the metallic inner part. The metallic inner part is accommodated together with this surrounding elastomer body in an elastic bearing body. The entire McPherson strut bearing is then inserted into a metallic housing, which can be fixed on the body of the motor vehicle. The vibrations of the wheel suspension which can be transmitted to the McPherson strut bearing via the end of the McPherson strut as well as via the spring, which is in contact with the underside of the McPherson strut bearing, are damped in the existing elastomer bodies, so that, on the whole, an uncoupling of the vibrations is achieved.

However, it is disadvantageous in such a design of the McPherson strut bearing that especially movements of this McPherson strut bearing extending at right angles to the longitudinal direction of the McPherson strut are hardly damped at all. Furthermore, the elastic bearing body is accommodated directly in a metallic housing and it correspondingly has no freedom of movement. Even though the design of the McPherson strut bearing being described is very simple, it does not sufficiently meet increased requirements in terms of comfort as a consequence of its relatively hard spring characteristics.

A McPherson strut bearing for the upper connection of a McPherson strut in a motor vehicle, which has an inner part with a central through hole for accommodating the upper end of the McPherson strut, has been known from U.S. Pat. No. 4,478,396. An elastomer body is arranged circularly on the outer circumference of the inner part; this elastomer body is split approximately in the middle according to the disclosure of this document.

The basic technical object of the present invention is to develop a McPherson strut bearing for the upper connection of a McPherson strut in a motor vehicle, in which the uncoupling of the vibrations generated on the wheel suspension against the vehicle body also meets high requirements in terms of comfort. The McPherson strut bearing shall have a simple design and be able to be manufactured at low cost, so that it can be manufactured in the smallest possible number of assembly steps. An assembly process for such a McPherson strut bearing shall correspondingly be developed as well.

This technical object is accomplished by the present invention with the features of patent claim 1 as well as the process features according to patent claim 17.

Thus, a McPherson strut bearing according to the present invention for the upper connection of a McPherson strut in a motor vehicle has an inner part with a central through hole for accommodating the upper end of a McPherson strut. An elastomer body is arranged circularly on the outer circumference of the inner part. Moreover, the inner part with the elastomer body is accommodated within an elastic bearing body. However, unlike in the solutions known from the state of the art, a cage is provided between the inner part with the elastomer body made in one piece with it and the elastic bearing body. This [cage] completely accommodates the inner part together with the elastomer body. The cage is in turn accommodated completely in the elastic bearing body up to a bilateral opening cross section for introducing and fastening the upper end of the McPherson strut.

At least the cage of the bearing bodies and a circlip surrounding the bearing body at least partially are split in a plane passing through the central longitudinal axis of the McPherson strut bearing.

Such a McPherson strut bearing design is very simple, can be manufactured at low cost and is inserted as a prefabricated assembly unit directly into the motor vehicle and is subsequently connected to the McPherson strut and the motor vehicle body.

Other embodiments of the present invention are the subject of the subclaims.

It is proposed, e.g., that a flange be made in one piece with the outer surface of the elastic bearing body. This flange advantageously comprises two webs, between which a circlip is inserted.

For reasons of stability, the inner part should be designed as a metallic inner part of an approximately disk-shaped geometry, wherein the circumferential edge area of the metallic inner part may be bead-shaped or it forms a bead. The bead-shaped design facilitates the fastening of the elastomer body, which is preferably arranged on it by injection molding. This very small, prefabricated unit of a McPherson strut bearing according to the present invention also makes it possible to prepare contact surfaces on the elastomer body during the manufacturing process for receiving and guiding the McPherson strut to support its fastening or mounting in the motor vehicle. Furthermore, the elastomer body can contribute to an increase in comfort due to its shape by damping buffers being made in one piece with the elastomer body on at least one side in another embodiment of the present invention. These damping buffers may have various geometries.

Provisions are made in another, highly advantageous embodiment of the present invention for composing the cage, the bearing body and the retaining ring from two centrally divided individual parts of identical design. The McPherson strut bearing according to the present invention is substantially simplified by this measure. In addition, the number of individual parts is reduced, on the whole, which leads to considerable advantages in terms of costs.

The circlip, which is used, on the whole, to hold together a McPherson strut bearing according to the present invention as a prefabricated assembly unit, also has one peculiarity: It can be manufactured from two congruent circlip halves. These circlip halves have a connection pin on one side and a mount, which is complementary hereto, on the opposite side of the circlip half, so that the two circlip halves can be coupled with one another. However, only one circlip half must be manufactured in duplicate.

According to another embodiment of the present invention, each of the cage half shells formed by the division shall, moreover, have an adjusting pin on its cage jacket circumference, which pin can be introduced into a complementary adjusting groove of the associated other cage half shell. Since the cage half shells are of identical design according to the present invention, each cage half shell has both an adjusting groove and an adjusting pin. These are preferably arranged on the cage jacket circumference. Before the mounting of the elastomer body with the inner part arranged therein, the cage half shells formed by the division form a state of preassembly, which is characterized by an enlarged, e.g., slightly conical opening cross section. The elastomer body with the inner part arranged within the said elastomer body can be inserted into the cage in a simple manner through this enlarged opening cross section without having to overcome a considerable resistance. The components can thus be easily assembled. The entire assembly unit is subsequently held together by a retaining ring placed on the cage jacket circumference and thus secured.

Furthermore, it is considered to be meaningful in a McPherson strut bearing according to the present invention to provide, e.g., the bearing body with an inner contour complementary to the outer contour of the cage. To meet the increased requirements in terms of comfort, it is, moreover, possible to make damping buffers in one piece with the outer contour of the elastomer body and/or of the bearing body.

Furthermore, the underside of the bearing body should have a geometry that is adapted to the spring plate that is in contact with it.

The following advantageous sequence of assembly of a preferred McPherson strut bearing according to the present invention is obtained in the knowledge of the above-described technical features of a McPherson strut bearing according to the present invention:

Insertion of the inner part jacketed with the elastomer body into the cage half shells of the cage, fitting together of the cage half shells, pushing of the retaining ring over the circumference of the cage jacket, axial deformation of the upper side as well as the underside of the cage, so that the elastomer body is accommodated in the cage with axial pretension, attachment of the half shells of the bearing body to the outer surface of the cage, and insertion of the circlip into the mounting groove formed by the webs of the flange, simultaneously connecting the two circlip halves.

The above-mentioned features, which will be explained later, may be used not only alone but also in any desired combination with one another or with prior-art features known from the prior art without going beyond the scope of the present invention.

A preferred exemplary embodiment of a McPherson strut bearing according to the present invention will be explained in greater detail below with reference to the corresponding drawings.

In the drawings,

FIG. 5 shows a circlip half.

Figure 1:
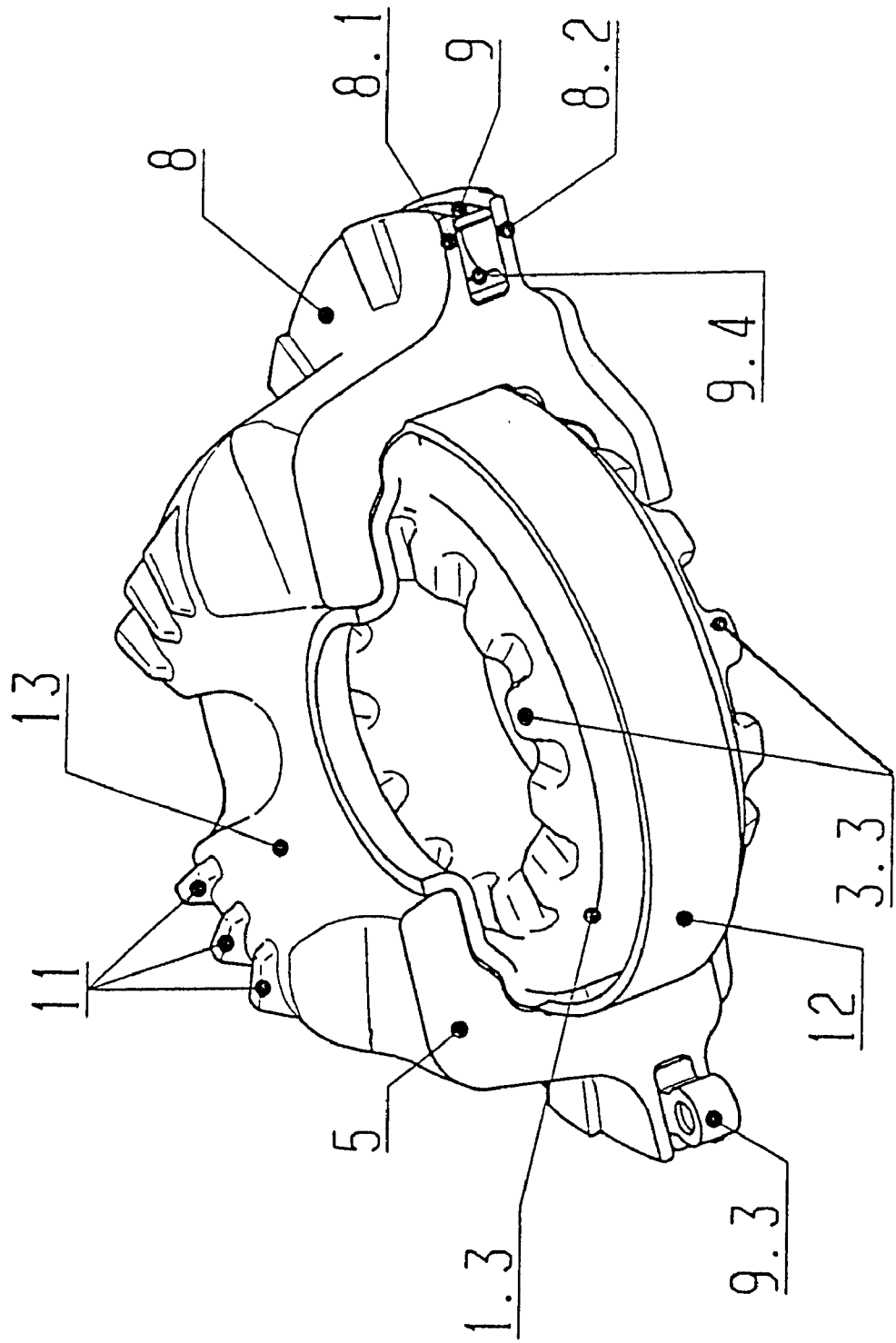
FIG. 1 shows a three-dimensional view of one half of a McPherson strut bearing.

The figures show, on the whole, a preferred embodiment of a McPherson strut bearing for the upper connection of a McPherson strut in a motor vehicle as it can be manufactured as a complete, prefabricated assembly unit. Such a McPherson strut bearing has an inner part 1, which has a through hole 2. The upper end of the McPherson strut is passed through the through hole 2 and is subsequently fixed on the McPherson strut bearing, e.g., by means of a screw connection. The metallic inner part 1, which is made of aluminum in this case, is connected to an elastomer body 3 at its outer circumference designed as a bead 1.1 or in a bead-like manner, incorporated in the material. In this embodiment, the bead 1.1 was designed as an elastomer body that is arranged on the disk-shaped inner part 1.

The elastomer body 3 has contact surfaces or guide surfaces 3.1 and 3.2, which are used to facilitate the assembly of the McPherson strut as well as its guiding and positioning in the McPherson strut bearing. Moreover, damping buffers 3.3 are made in one piece with the upper side and the underside of the elastomer body 3. These damping buffers make it possible to obtain any axial damping characteristic which can be selected to be as soft as desired. The inner part 1, which is surrounded by the elastomer body prepared by injection molding, is accommodated, as a whole, in two cage half shells 4.1 and 4.2 of identical design. The cage half shells 4.1 and 4.2 together form the cage 4. To simplify the assembly of the cage half shells 4.1 and 4.2, both an adjusting pin 4.4 is made in one piece with the cage jacket circumference 4.3 of each cage half shell and an adjusting groove 4.5 is provided on the cage jacket circumference 4.3 of each cage half shell. The adjusting pin 4.4 of the first cage half shell 4.1 engages the adjusting groove 4.5 of the second cage half shell 4.2, so that axial securing is guaranteed. To make it possible to hold together the cage, a retaining ring 12 is pulled over its cage jacket circumference 4.3.

The cage 4 is inserted as a whole into a bearing body 5 made of an elastic material. The underside 5.1 of the bearing body 5 has a geometry adapted to the spring plate 14, not shown in the figures. Furthermore, a flange 8 is made in one piece with the outer circumference of the elastic bearing body 5. This [flange] comprises in this case two webs 8.1 and 8.2, which form an annular groove of a U-shaped cross section. This annular groove is designed as circular on the elastic bearing body 5 shown and accommodates the circlip 9 between the webs 8.1 and 8.2.

This circlip 9 comprises, in turn, two circlip halves 9.1 and 9.2, of which the circlip half 9.1 is shown as an example in FIG. 5. The circlip halves 9.1 and 9.2 are of identical design and have a connection pin 9.3 each, which can be inserted into a complementary mount 9.4 of the other circlip.

Furthermore, the elastic bearing body 5 is provided with respective damping buffers 11 and 13 on its upper surface which can be inserted into the motor vehicle. These damping buffers, which are made in one piece with the elastic bearing body 5, are used to increase the comfort of the motor vehicle. The damping buffers 11 are designed in this embodiment as narrow webs, while the damping buffers 13 have a considerably larger volume and carry the damping buffers. The combination of the damping buffers 11 with the damping buffers 13 approximately corresponds to a series connection of a plurality of springs with different spring rates. In addition, it is possible to achieve a tolerance compensation within the McPherson strut bearing by means of the damping buffers 11.

Moreover, an opening cross section 7, into which the upper end of the McPherson strut can be indirectly or directly inserted, is present in the elastic bearing body 5. The opening cross section 6 in the elastic bearing body 5 is provided to establish a screw connection between the upper McPherson strut and the inner part 1 of the McPherson strut bearing according to the present invention.

Figure 2:
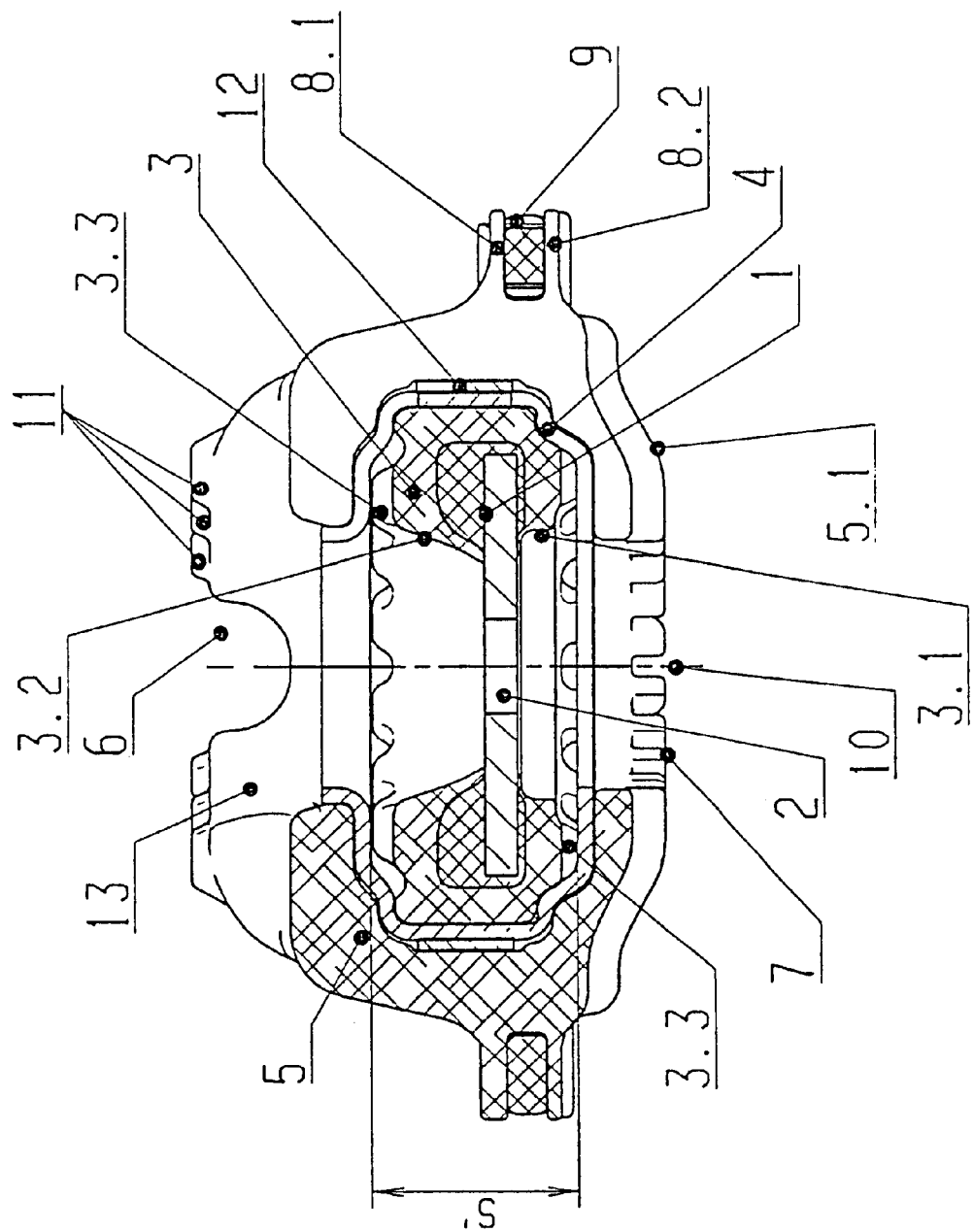
FIG. 2 shows a section through a McPherson strut bearing according to the present invention.
Figure 3:
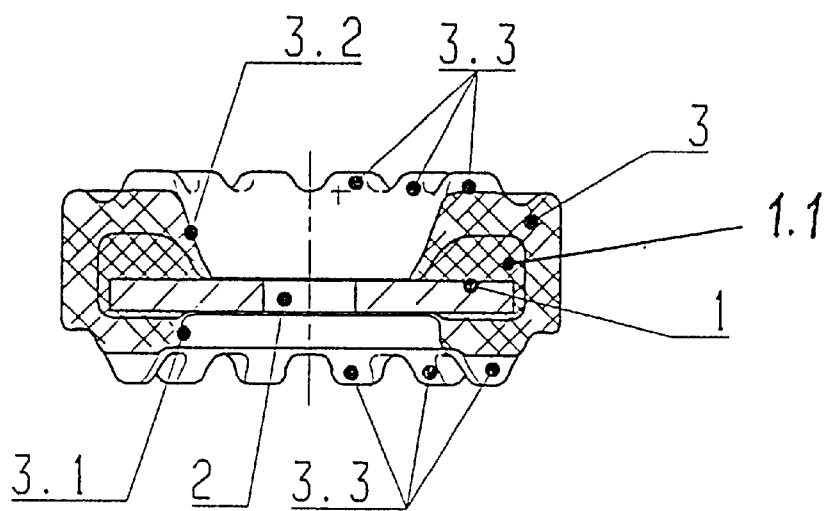
FIG. 3 shows a detail of a section through an inner part with an elastomer body made in one piece with it.
Figure 4:
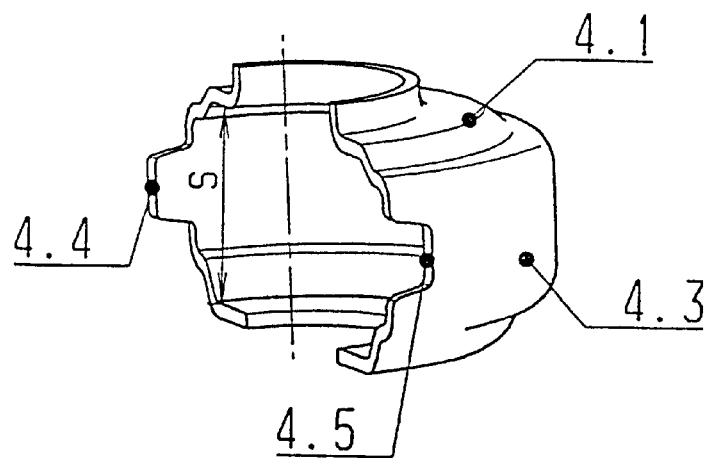
FIG. 4 shows a three-dimensional view of a cage half shell.

The distance "s" is indicated in FIG. 4 by an arrow between the inner surfaces of the cage 4. This distance "s,"

characterizing the preassembly state, is reduced after the assembly to the reduced distance "s'" indicated in FIG. 2, so that the elastomer body 3 accommodated in the cage 4 is accommodated in the cage 4 together with the inner part 1 arranged therein under axial pretension.

The McPherson strut bearing according to the present invention, but at least the cage 4, the circlip 9 as well as the elastic bearing body 5 are split in the middle. The section extends in a plane passing through the longitudinal central axis 10 of the McPherson strut bearing according to the present invention.

| List of Reference Numbers: | |
|---|---|
| 1 | Inner part |
| 1.1 | Bead |
| 2 | Through hole |
| 3 | Elastomer body |
| 3.1, 3.2 | Contact surface |
| 3.3 | Damping buffer |
| 4 | Cage |
| 4.1, 4.2 | Cage half shell |
| 4.3 | Cage jacket circumference |
| 4.4 | Adjusting pin |
| 4.5 | Adjusting groove |
| 5 | Bearing body |
| 5.1 | Underside of the bearing body |
| 6, 7 | Opening cross sections |
| 8 | Flange |
| 8.1, 8.2 | Web |
| 9 | Circlip |
| 9.1, 9.2 | Circlip halves |
| 9.3 | Connection pin |
| 9.4 | Mount |
| 10 | Longitudinal central axis |
| 11 | Damping buffer |
| 12 | Retaining ring |
| 13 | Damping buffer |
| 14 | Spring plate |
| s | Distance before assembly |
| s' | Distance after assembly |

What is claimed is:

1. A McPherson strut bearing for the upper connection of a McPherson strut in a motor vehicle, the McPherson strut bearing comprising:
   an inner part with a said central through hole for accommodating the upper end of the McPherson strut;
   an elastomer body arranged circularly on the outer circumference of said inner part;
   a cage accommodating said inner part with said elastomer body;
   an elastic bearing body completely accommodating said cage up to a bilateral opening cross sectional region;
   a circlip surrounding said elastic bearing body; and, said cage, and said elastic bearing body and said circlip being divided in a plane passing through a central longitudinal axis of the McPherson strut bearing.

2. A McPherson strut bearing in accordance with claim 1, wherein said bearing body has a flange made in one piece with an outer surface of said bearing body, said flange including webs, said circlip being inserted between said webs.

3. A McPherson strut bearing in accordance with claim 1, wherein said metallic inner part is substantially disk-shaped.

4. A McPherson strut bearing in accordance with claim 1, wherein the circumferential edge area of said inner part has a disk-shaped or forms a bead.

5. A McPherson strut bearing in accordance with claim 4, wherein said inner part is surrounded with said elastomer body, said elastomer body being disposed surrounding said inner part by injection molding.

6. A McPherson strut bearing in accordance with claim 5, wherein said elastomer body has said contact surfaces for receiving and guiding the McPherson strut or its fastening.

7. A McPherson strut bearing in accordance with claim 5, wherein said elastomer body has said damping buffers on at least one side.

8. A McPherson strut bearing in accordance with claim 1, wherein said cage, said bearing body and said circlip are each respectively composed of two centrally divided individual half parts of identical design.

9. A McPherson strut bearing in accordance with claim 8, wherein each of said circlip halves are formed by a division to provide a connection pin on at least one side, which can be inserted or snapped into a complementary mount of the associated other circlip half.

10. A McPherson strut bearing in accordance with claim 8, wherein each of said cage half shells has a cage jacket circumference with said adjusting pin which can be introduced or snapped into a complementary adjusting groove of the associated other cage half shell.

11. A McPherson strut bearing in accordance with claim 8, wherein before the mounting of said elastomer body with said inner part arranged therein, said cage half shells have a preassembled state with an increased cross section.

12. A McPherson strut bearing in accordance with claim 8, wherein said increased cross section is a slightly conical opening cross section.

13. A McPherson strut bearing in accordance with claim 1, wherein said elastomer body with said inner part arranged therein is accommodated in said cage with axial pretension.

14. A McPherson strut bearing in accordance with claim 1, wherein said cage is secured by a retaining ring.

15. A McPherson strut bearing in accordance with claim 1, wherein said bearing body has an inner contour complementary to an outer contour of said cage.

16. A McPherson strut bearing in accordance with claim 1, wherein said bearing body has damping buffers on its outer contour.

17. A McPherson strut bearing in accordance with claim 1, further comprising a spring plate wherein said bearing body has an underside, said bearing body having a geometry adapted to said spring plate which is in contact with it.

18. A process for assembling a A McPherson strut bearing with an inner part with a said central through hole for accommodating the upper end of the McPherson strut an elastomer body arranged circularly on the outer circumference of said inner part, a cage accommodating said inner part with said elastomer body, an elastic bearing body completely accommodating said cage up to a bilateral opening cross sectional region, a circlip surrounding said bearing body and with said cage, said bearing body and said circlip surrounding said bearing body being divided in a plane passing through a central longitudinal axis of the McPherson strut bearing, the process comprising the steps of:
   inserting said inner part jacketed with said elastomer body into cage half shells of said cage;
   fitting together said cage half shells of said cage;
   pushing a retaining ring over said cage jacket about a circumference;
   axially deforming both an upper side and an underside of said cage, so that said elastomer body is accommodated in said cage under pretension;
   attaching half shells of said bearing body to the outer surface of said cage;
   inserting said circlip into said mounting groove formed by webs of said flange and substantially simultaneously connecting ends of circlip halves of said circlip.

* * * * *